US012742932B2

(12) United States Patent
Su et al.

(10) Patent No.: US 12,742,932 B2
(45) Date of Patent: Sep. 22, 2026

(54) OPTICAL COUPLER WITH DIFFERENT WAVEGUIDE MATERIALS

(71) Applicant: Intel Corporation, Santa Clara, CA (US)

(72) Inventors: Tiehui Su, San Jose, CA (US); Boris M. Vulovic, Campbell, CA (US); Wei Qian, Walnut, CA (US); Kelly Magruder, Albuquerque, NM (US); Pegah Seddighian, San Jose, CA (US); Wenhua Lin, Fremont, CA (US); Harel Frish, Albuquerque, NM (US); Nutan Gautam, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 297 days.

(21) Appl. No.: 18/521,694

(22) Filed: Nov. 28, 2023

(65) Prior Publication Data

US 2024/0184051 A1 Jun. 6, 2024

Related U.S. Application Data

(60) Provisional application No. 63/429,331, filed on Dec. 1, 2022, provisional application No. 63/429,310, filed on Dec. 1, 2022.

(51) Int. Cl.
*G02B 6/125* (2006.01)
*G02B 6/12* (2006.01)
(Continued)

(52) U.S. Cl.
CPC ......... *G02B 6/125* (2013.01); *G02B 6/12016* (2013.01); *G02B 6/12019* (2013.01);
(Continued)

(58) Field of Classification Search
CPC ........................... G02B 6/125; G02B 6/12016; G02B 6/12019; G02B 6/1228; G02B 6/29331; G02B 2006/12061; G02B 2006/12147
(Continued)

(56) References Cited

U.S. PATENT DOCUMENTS 8,615,148 B2 * 12/2013 Chen .................... G02B 6/1228 385/43
10,473,858 B1 11/2019 Mahgerefteh et al.
(Continued)

FOREIGN PATENT DOCUMENTS

CN 115047564 A * 9/2022 ............. G02B 6/122
JP 2003-207664 * 7/2003 ............. G02B 6/122

OTHER PUBLICATIONS

Elshaari et. al., "Thermo-optic characterization of silicon nitride resonators for cryogenic photonic circuits", IEEE Photonics Journal vol. 8 Issue 3, Jun. 2016, pp. 1-9.
(Continued)

*Primary Examiner* — Robert Tavlykaev
(74) *Attorney, Agent, or Firm* — Schwabe, Williamson & Wyatt, P.C.

(57) ABSTRACT

Embodiments herein may relate to an optical coupler that includes a silicon substrate and a silicon nitride waveguide positioned on the silicon substrate. The silicon nitride waveguide may be configured to guide an optical signal along a first axis. The optical coupler may further include a silicon waveguide positioned on the silicon substrate. The silicon waveguide may be configured to receive, from an output end of the silicon nitride waveguide, the optical signal at an input end of the silicon waveguide and guide the optical signal along a second axis that is at a first angle to the first axis. Other embodiments may be described and/or claimed.

17 Claims, 11 Drawing Sheets

(51) Int. Cl.
*G02B 6/122* (2006.01)
*G02B 6/293* (2006.01)

(52) U.S. Cl.
CPC ....... *G02B 6/1228* (2013.01); *G02B 6/29331* (2013.01); *G02B 2006/12061* (2013.01); *G02B 2006/12147* (2013.01)

(58) Field of Classification Search
USPC .................................. 385/28, 30, 31, 43, 50
See application file for complete search history.

(56) References Cited

U.S. PATENT DOCUMENTS 12,265,259 B2 4/2025 Israel et al.
2008/0193079 A1* 8/2008 Cheben .................... G02B 6/14 385/28
2009/0297093 A1* 12/2009 Webster ............... G02B 6/1228 264/1.25
2014/0321801 A1* 10/2014 Ellis-Monaghan .... G02B 6/136 385/32
2016/0131837 A1* 5/2016 Mahgerefteh .......... G02B 6/124 385/14
2018/0024299 A1* 1/2018 Leijtens ................... G02B 6/14 385/28
2018/0164501 A1* 6/2018 Norberg ................... G02B 6/26
2019/0170941 A1* 6/2019 Mahgerefteh ........ G02B 6/1228
2019/0293881 A1* 9/2019 Chen .................. G02B 6/29332
2019/0310423 A1* 10/2019 Lee ........................ G02B 6/305
2019/0391325 A1* 12/2019 Iida .......................... G02B 6/32
2022/0013985 A1 1/2022 Koch et al.
2022/0146749 A1* 5/2022 Bandyopadhyay .... G02B 6/125
2023/0400652 A1* 12/2023 Heidelberger ....... G02B 6/4295
2024/0004140 A1* 1/2024 Bian .................... G02B 6/1228

OTHER PUBLICATIONS

Feng et. al., “Athermal silicon ring resonators clad with titanium dioxide for 1.3 μm wavelength operation” Optics Express vol. 23, No. 20, Oct. 5, 2015, 8 pages.

Office Action mailed Jan. 15, 2026 for U.S. Appl. No. 18/521,734, 12 pages.

Final Office Action mailed Jun. 25, 2026 for U.S. Appl. No. 18/521,734, 14 pages.

* cited by examiner 740
703
720
725

OPTICAL COUPLER WITH DIFFERENT WAVEGUIDE MATERIALS

CROSS-REFERENCE TO RELATED APPLICATIONS

The present application claims priority to U.S. Provisional Patent Application 63/429,310, filed on Dec. 1, 2022, and U.S. Provisional Patent Application 63/429,331, filed on Dec. 1, 2022, the contents of which are incorporated herein in their entirety.

BACKGROUND

Silicon nitride (referred to herein as "SiN" although different embodiments may include different compounds such as $Si_3N_4$, a layer that includes silicon and nitrogen (or compounds or alloys thereof), and/or some other compound) may provide relatively low-loss and low-temperature sensitivity passive component alternatives for integrated silicon photonics transceivers. SiN may be particularly useful in applications related to a low-loss athermal demultiplexer (DeMUX), chip delay lines, and/or other thermally stable passive components. However SiN may have a confinement factor (e.g., the ratio of the optical signal within the waveguide to the optical signal within the entire structure) lower than, for example, a silicon waveguide (which may be referred to as a "Si" waveguide), and therefore require a thicker top and/or bottom cladding to reduce leakage of the light into surrounding materials such as the substrate Si.

On the other hand, integration of the laser (e.g., an optical source for the optical signal that propagates through the SiN waveguide) on the same chip as the DeMUX and/or the SiN waveguide may require a thinner buried oxide (BOX) layer due to thermal stability requirements of the laser. As such, the relatively thicker top and/or bottom cladding of the SiN waveguide may be in conflict with the relatively thinner BOX layer required by the laser.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Figure 1:
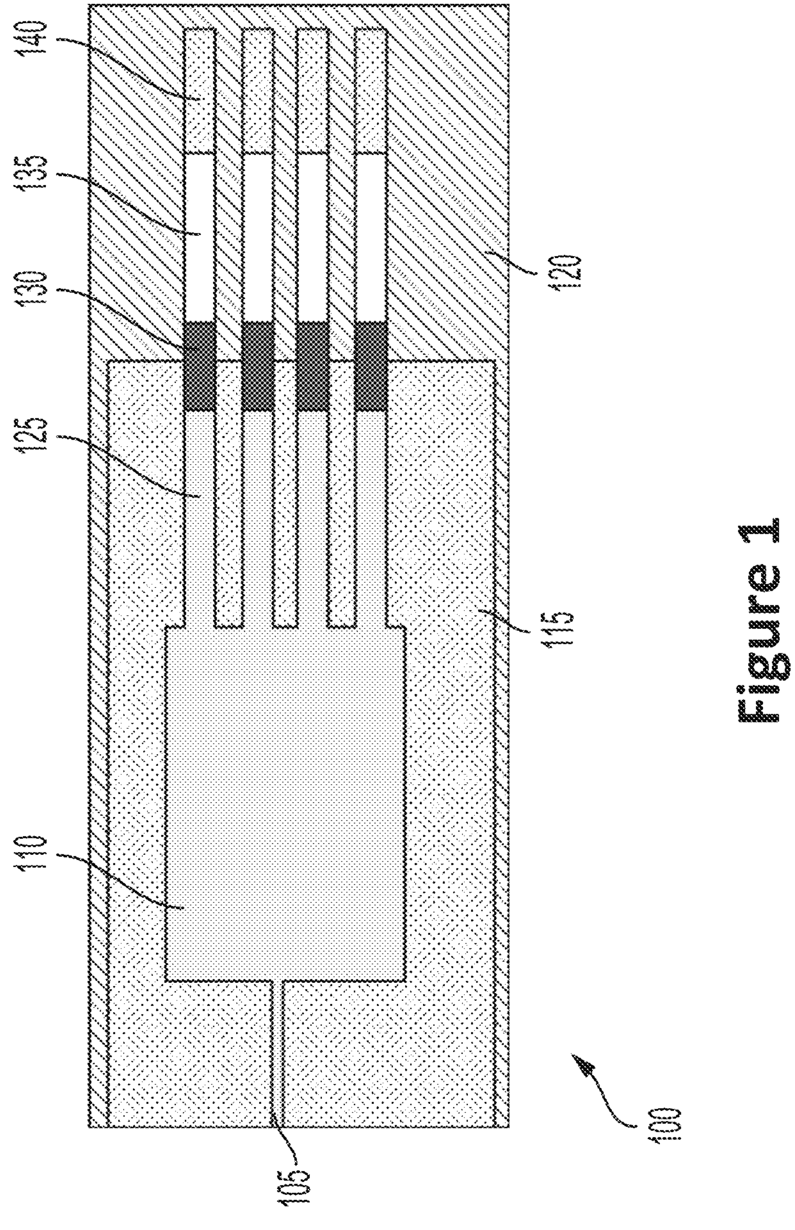
FIG. 1 illustrates an example of a photonic integrated circuit (PIC) with a Si and SiN optical components, in accordance with various embodiments.

Embodiments described herein related to an integrated SiN athermal DeMUX on a relatively thin BOX silicon-on-insulator (SOI) substrate. More generally, embodiments herein relate to an optical coupler that couples a SiN waveguide with a Si waveguide with relatively low loss and low back reflection.

More generally, embodiments relate to integration of athermal SiN passive components (e.g., a DeMUX or some other passive component) on an optical transceiver chip, which may provide for a fully integrated optical transceiver (e.g., all elements of the optical transceiver on a single chip). Embodiments may include one or both of the following two elements: (a) SiN DeMUX on a raised oxide platform on a BOX SOI, which may support integration with a laser, optical transmitter, and/or other optical source; and (b) an optical coupler that allows for efficient and low-loss optical signal transmission between a Si waveguide and a SiN waveguide.

It will be understood that a reference to a SiN waveguide may refer to a layer that includes silicon and nitrogen (or compounds or alloys thereof), and acts as an optical waveguide. Similarly, it will be understood that a reference to a Si waveguide may refer to a layer that includes silicon (or compounds or alloys thereof), and acts as an optical waveguide.

Embodiments may provide for a variety of advantages. For example, embodiments may provide for a thermally stable integrated wavelength division multiplexing (WDM) transceiver. As data rates of the optical signal increase, integrated athermal transceivers such as the ones enabled herein may enable higher link budgets and deliver increased data performance without increasing power consumption. For example, embodiments may provide for transceivers that are capable of conveying optical signals with multiple guided modes between waveguides made of different materials (e.g., the Si waveguide and the SiN waveguide) in a relatively efficient manner. Such efficiency may be measured in terms of optical signal loss, optical signal back-reflection, and/or one or more additional or alternative factors.

Generally, WDM optical networks may be considered to be a significant technology in fiber optic backbones, data center interconnects, long-distance data transmission, etc. WDM may be implemented, for example, using Si photonics in commercial deployments such as data centers. One challenge to such implementation is that Si may be sensitive to temperature fluctuations inherent in the data center environment. For example, if the data center environment becomes warmer or cooler, the optical transmission properties of the Si waveguides may change. For that reason, it may be beneficial to guide the optical signal through a different material that is less sensitive to such temperature changes.

One example alternative material is SiN. In some cases, SiN may have a thermo-optic coefficient that is six or seven times smaller than that of Si. In other words, the SiN waveguide may experience a change to its optical properties that is 1/6 to 1/7 that experienced by a Si waveguide in the same environment.

Figure 9:
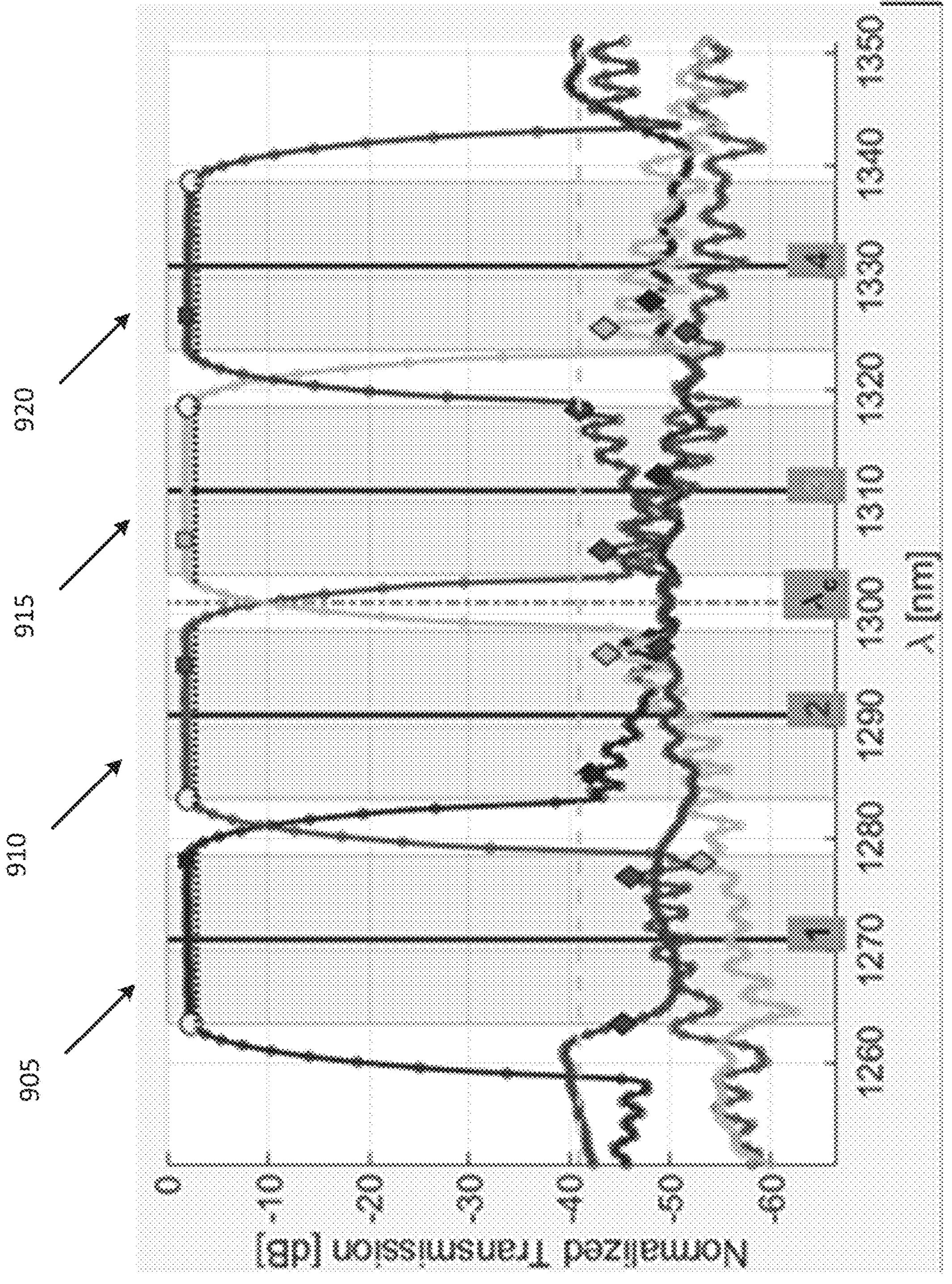
FIG. 9 illustrates an example of a four-channel flat-top DeMUX spectrum with multimode output guiding six optical modes within each channel.

Additionally, for DeMUXes with a flat-top channel shape, it may be desirable to utilize multimode output waveguides that facilitate the flat-top channel shape with a plurality of modes (e.g., six or more modes in some embodiments). As used herein, a flat-top channel shape may refer to a DeMUX that provides a relatively flat transmission amplitude over a plurality of consecutive wavelengths in a channel. FIG. 9 depicts an example of a flat-top channel shape, where there are four different channels 905, 910, 915, and 920. Generally, a flat-top channel shape may help maintain demultiplexer performance such as insertion loss (IL) or total crosstalk (TXT), even in the event of a wavelength shift such as may be caused by fabrication variation or environmental temperature variation.

FIG. 1 illustrates an example top-down partial view of a photonic integrated circuit (PIC) 100 with a Si and SiN components, in accordance with various embodiments. It will be understood that the example view of PIC 100 only depicts, for example, a receive (Rx) portion of a transceiver circuit implemented as part of the PIC 100. The PIC 100 may further include a transmitter (Tx), which may include an optical source, such as a laser (not shown for the sake of lack of clutter). As noted, it may be desirable for the entirety of the PIC 100, and specifically both the Rx and Tx portion of the PIC 100, to be implemented on a single chip as described above.

The example of FIG. 1 depicts a PIC 100 that includes a SiN DeMUX 110. The SiN DeMUX 110 may be based on a multimode array waveguide grating (AWG) or echelle grating (EG), and integrated into the PIC 100. Specifically, the PIC 100 may include a Si substrate 120, with a BOX layer 115 positioned at least partially thereon. In some embodiments, the BOX layer 115 may span almost the entirety of the Si substrate 120, as will be discussed in other embodiments. However, for the sake of discussion herein, the BOX layer 115 is shown in FIG. 1 for the sake of depicting where a thicker BOX layer 115 may be present (e.g., under the SiN material).

The SiN DeMUX 110 may receive an optical signal from an input waveguide 105 (which may be, in this embodiment, SiN). The optical signal may include a plurality of different modes. The SiN DeMUX 110 may separate the various wavelengths of the light, and output the different wavelengths of light into different ones of a plurality of SiN waveguides 125.

As may be seen in FIG. 1, the PIC 100 may include a plurality of photodiodes (PDs) 140 which may be, for example, Germanium or some other material. The PDs 140 may be positioned on the Si substrate 120 (or, more accurately, on a relatively thin BOX layer that is positioned between the Si substrate 120 and the PDs 140). The PDs 140 may receive the optical signal from a Si waveguide 135.

It will be understood that each one of the SiN waveguides 125 needs to be optically coupled to the corresponding Si waveguide 135 for the apparatus of FIG. 1 to work. However, as noted, the Si portions of the PIC 100 (e.g., the Si waveguides 135) may have relatively high thermo-dependence. Such relatively high thermo-dependence may be undesirable for functions such as those performed by the DeMUX 110, which is at least partially why it is desirable for the DeMUX 110 to be implemented using SiN. Conversely, the SiN DeMUX 110 and waveguides 125 may require a thicker BOX layer 115 than the Si waveguides 135 to prevent the optical signal from leaking from the DeMUX 110 or waveguides 125 into the Si substrate 120. As such, embodiments herein relate to implementations of the optical coupler 130 that may help to efficiently transfer an optical signal from a SiN waveguide 125 to a Si waveguide 135.

Figure 2:
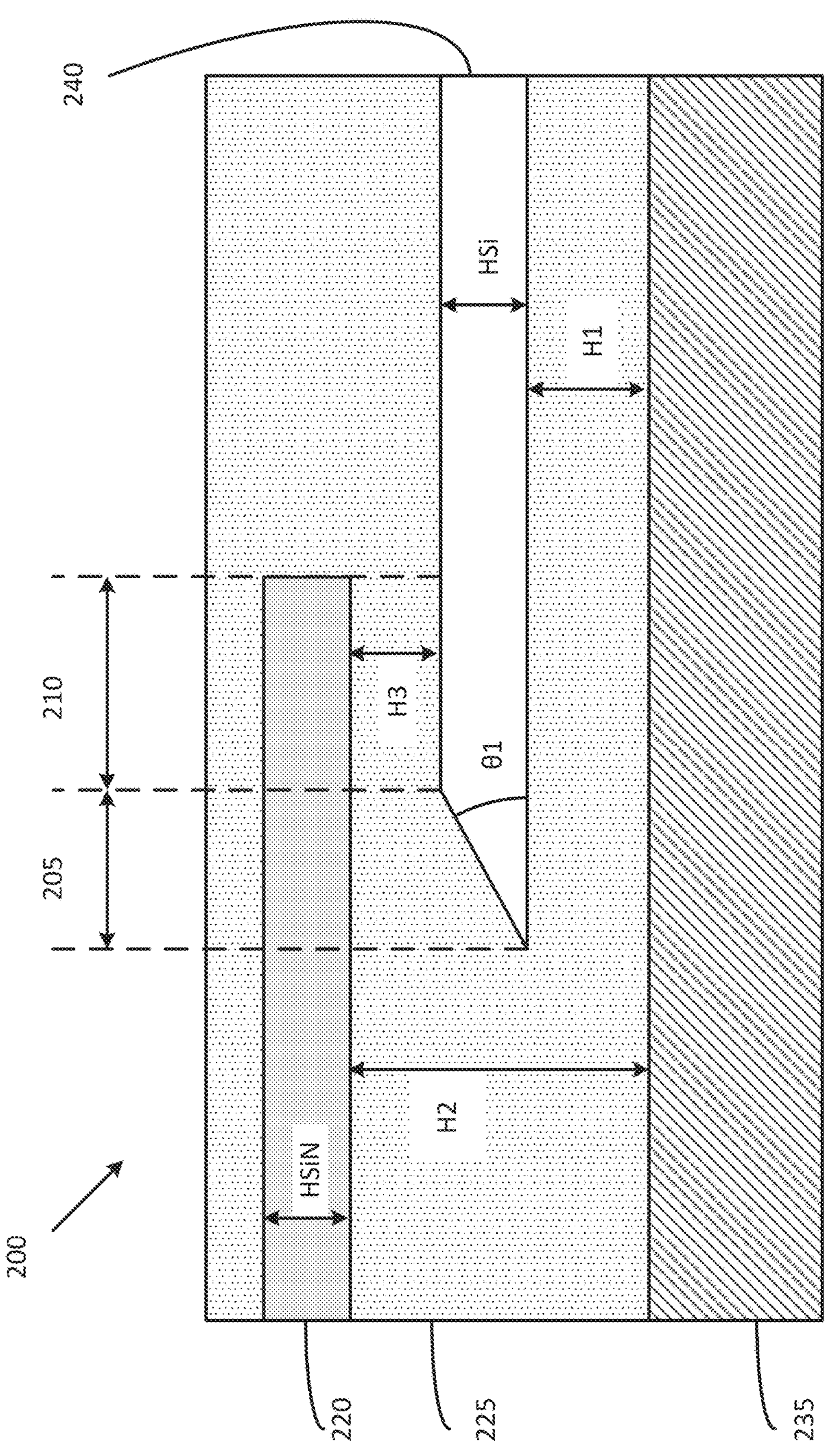
FIG. 2 illustrates an example optical coupler, in accordance with various embodiments.

FIG. 2 depicts an example embodiment of a coupler 200, which may be appropriate for use as coupler 130. Specifically, FIG. 2 depicts an example cross-sectional view of the coupler 200. It will be understood that the embodiment of FIG. 2 (and other Figures herein) is not intended to be depicted to scale, but rather is for the sake of discussion of concepts and embodiments herein. Unless specifically indicated otherwise, relative dimensions should not be assumed based solely on the depiction in various of the Figures herein.

The coupler 200 may include a Si substrate 235 with a Si waveguide 240 and a SiN waveguide 220 positioned thereon. The Si substrate 235 may generally be similar to Si substrate 120. The Si waveguide 240 may be similar to, for example, Si waveguide 135. The SiN waveguide 220 may be similar to, for example, SiN waveguide 125. As may be seen, at least a portion of the SiN waveguide 220 may overlap at least a portion of the Si waveguide 240 such that the portion of the Si waveguide 240 is positioned between the SiN waveguide 220 and the Si substrate 235. The portions of overlap are indicated in FIGS. 2 at 205 and 210, and will be discussed in greater detail below.

The Si waveguide 240 may have a thickness HSi, as shown in FIG. 2. HSi may be, for example approximately 390 nanometers (nm). More generally, HSi may be between approximately 200 nm and 400 nm. Additionally, the SiN waveguide 220 may have a thickness HSiN as shown in FIG. 2. In some embodiments, HSiN may be on the order of approximately 350 nm. More generally, HSiN may be between approximately 0.1 to approximately 15 micrometers (microns).

It will be understood that, when operational, the optical signal may enter the coupler 200 from the left side of FIG. 2 through the SiN waveguide 220. The optical signal may then travel from left to right along the Figure, where it may exit the SiN waveguide 220 and enter the Si waveguide 240 before exiting the coupler 200 to the right of FIG. 2.

In some embodiments, the Si waveguide 240 may be tapered as shown in FIG. 2 at tapered portion 205. The angle of taper, $\theta 1$, may be approximately 0.5°. More generally, the angle of taper, may be between approximately 0.1° and approximately 2.0°. The reason for the taper may be because the taper may facilitate mode coupling between the Si waveguide 240 and the SiN waveguide 220. By using a taper as shown in FIG. 2, the coupling efficiency of the two waveguides 240 and 220 may be more uniform between the different orders of waveguide modes (particularly, horizontal waveguide modes).

In some embodiments, as previously described, at least a portion of the SiN waveguide 220 may overlap the Si waveguide 240 at portion 210. In some embodiments, portion 210 may have a length of approximately 10 microns. More generally, the length of the portion 210 may be between approximately 5 microns and approximately 40 microns. Generally, the amount of overlap (e.g., the length of portion 210 as measured in a direction parallel to the axis of propagation of the optical signal through the SiN waveguide 220) may be based on process limitations of the coupler. Specifically, after approximately 5 microns, the length of the portion 210 may not significantly affect the coupling efficiency of the two waveguides 220 and 240.

In embodiments, the coupler 200 may further include an oxide layer 225. In some embodiments, at least a portion of the oxide layer 225 (e.g., the portion located between Si waveguide 240 and Si substrate 235 and/or between SiN waveguide 220 and Si substrate 235) may be referred to as the BOX layer. Additionally, it will be understood that although the oxide layer 225 is depicted as a unitary element, in some embodiments the oxide layer 225 may be formed in a series of processes that may also include, for example, the formation of the Si waveguide 240 and/or the SiN waveguide 220.

The thickness of the oxide layer 225 between the Si substrate 235 and the Si waveguide 240 may have a value H1, as shown in FIG. 2. In some embodiments, H1 may be approximately 1 micron, as described above. However, it will be recognized that in other embodiments H1 may be larger or smaller than 1 micron or, in some embodiments, between approximately 1 micron and approximately 3 microns. It will be recognized that these thicknesses are intended as examples of values in accordance with some embodiments, and the term "approximately" is used to indicate roughly +/−10% of the provided value based on factors such as manufacturing tolerances and/or other considerations.

The thickness of the oxide layer 225 between the Si substrate 235 and the SiN waveguide 220 may be H2 as shown in FIG. 2. Generally, H2 may be based on the sum of H1, HSi, and H3, as shown in FIG. 2. In one particular embodiment, H2 may be equal to approximately 1.7 microns (e.g., H1 is equal to approximately 1 micron, H3 is equal to approximately 0.3 microns, and HSi is equal to approximately 0.4 microns). This thickness of H2 may be based on process limitations related to other components positioned on the same wafer (e.g., a germanimum photodetector or some other component on the wafer). In some embodiments, H2 may be as large as 3 microns.

As described above, the relatively higher thickness of H2 (e.g., between approximately 1.5 microns and approximately 3 microns), may be desirable because if the distance between the SiN waveguide 220 and the Si substrate 235 is too low, then the optical signal may leak from the SiN waveguide 220 to the Si substrate, which may result in undesirable signal loss. By contrast, a relatively lower thickness of H1 (e.g., 1 micron) may be desirable because the relatively lower thickness may enable integration of an optical source on the PIC, as previously described. Additionally, the relatively lower thickness of H1 may be beneficial from a size and/or cost reduction standpoint.

As shown, the Si waveguide 240 may not be directly adjacent to the SiN waveguide 220. Rather, at least some amount of the oxide layer 225 may be positioned between the SiN waveguide 220 and the Si waveguide 240. The thickness of the oxide layer 225 between the SiN waveguide 220 and the Si waveguide 240 is represented as H3. H3 may be, for example, between approximately 100 nm and approximately 500 nm, although in other embodiments it may be larger or smaller.

Figure 3:
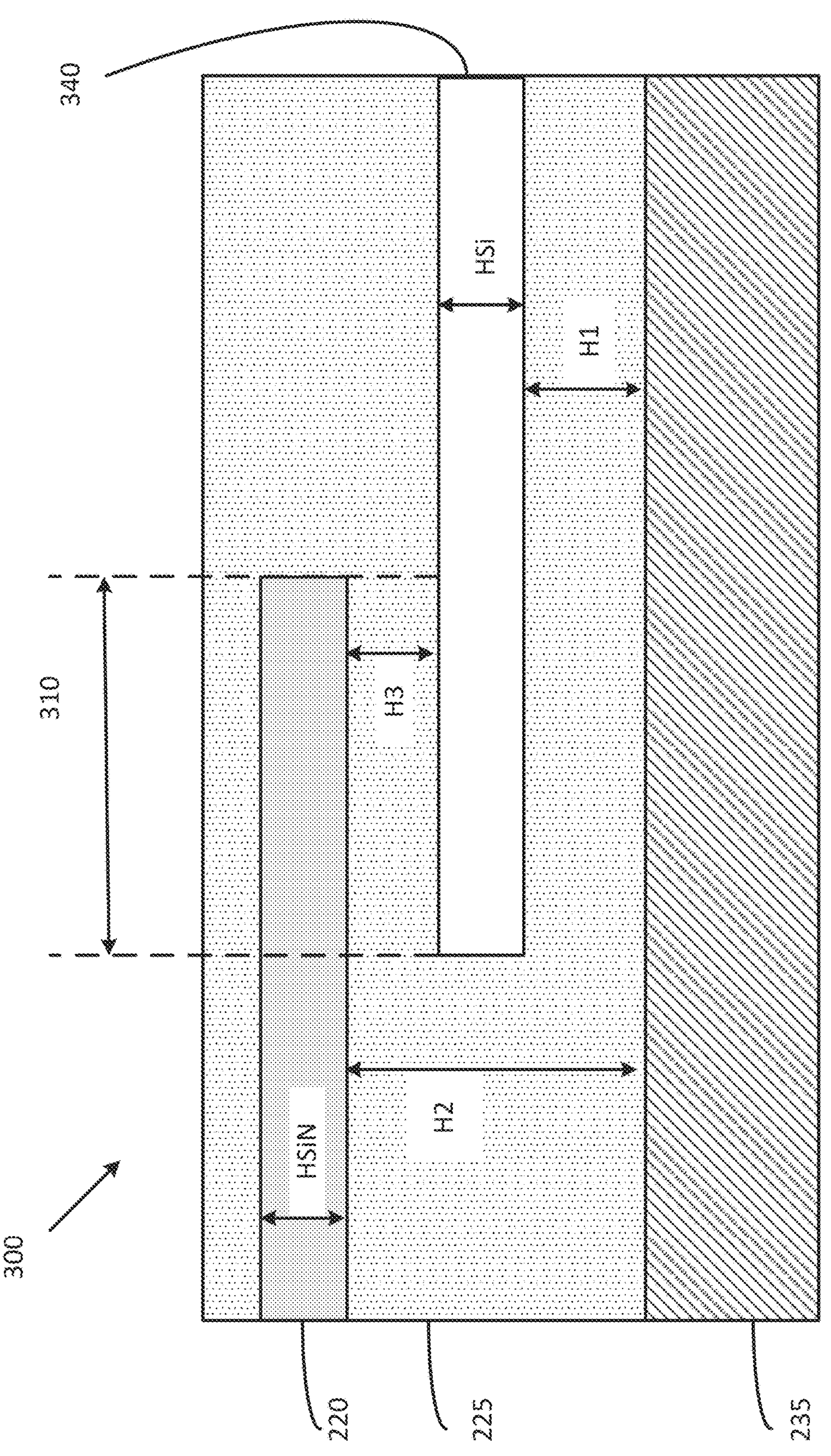
FIG. 3 illustrates an alternative example optical coupler, in accordance with various embodiments.

FIG. 3 depicts an alternative example coupler 300, which may include several elements of, or similar to those of, FIG. 2. Such elements will not be re-described for the sake of lack of redundancy.

As may be seen in FIG. 3, the coupler 300 may include a Si waveguide 340, which may be generally similar to Si waveguide 240 of FIG. 2. However, in this embodiment, the SiN waveguide 220 overlaps the Si waveguide 340 at 310, as shown. In embodiments, the overlap 310 may have a length that is similar to that of portion 210, described above. Additionally, as shown, the Si waveguide 340 may not be tapered in a manner similar to that of FIG. 2.

Figure 4:
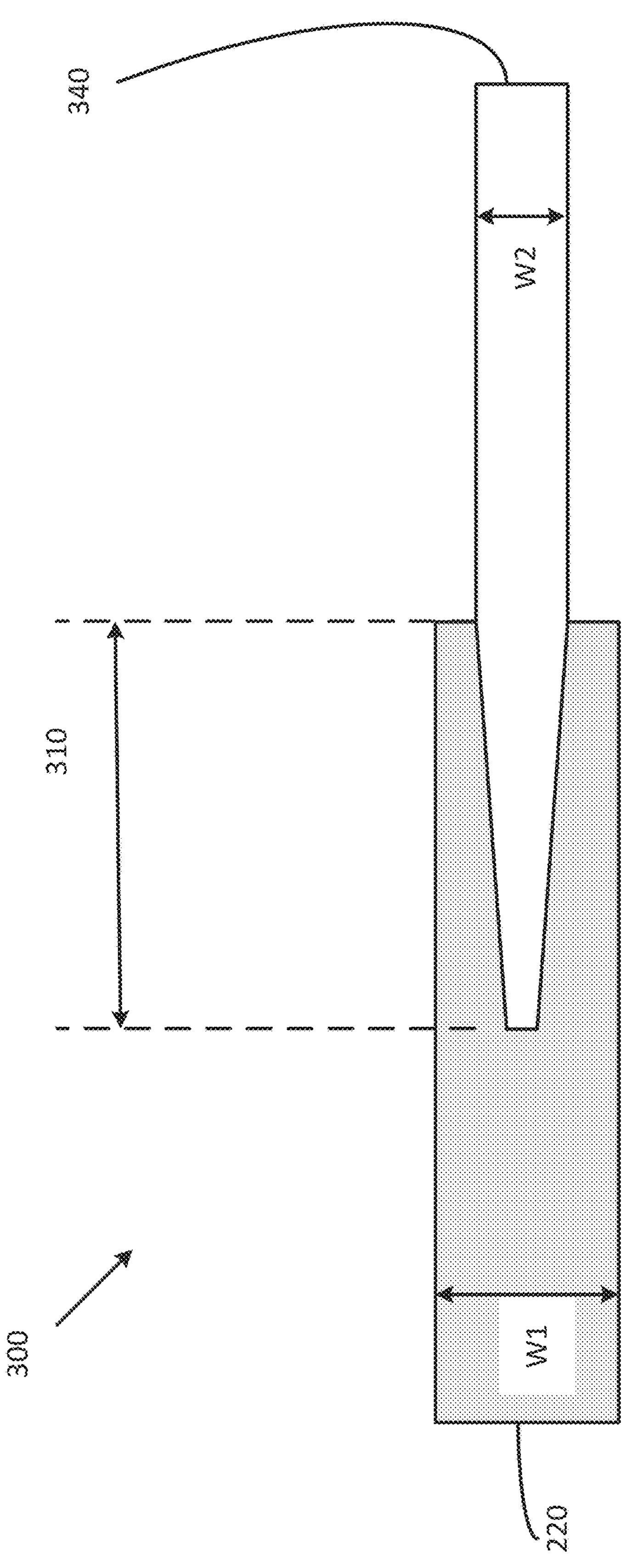
FIG. 4 illustrates a bottom-up example view of the optical coupler of FIG. 3, in accordance with various embodiments.

However, FIG. 4 depicts a simplified bottom-up view of the optical coupler 300. As may be seen, the SiN waveguide may have a width W1 of approximately 800 nm, however in other embodiments the width W1 may be between approximately 600 nm and approximately 2 microns. The Si waveguide 340 may have a width W2 of approximately 0.4 microns, however in other embodiments the width W2 may be between approximately 0.4 microns and approximately 1 micron. As may be seen, rather than tapering along a vertical direction, for example as is shown in FIG. 2, the Si waveguide 340 may taper in a direction that is orthogonal to the direction of propagation of the optical signal and parallel to the face of the Si substrate 235. In this manner, the benefits of the taper as described above may be realized while using a different form factor.

The taper of FIG. 4, rather than the taper of FIG. 3, may be desirable based on the specific mode(s) of light that are being conveyed through the coupler. For example, FIG. 4 depicts a taper that may be referred to as being "horizontal" in direction. By contrast, FIG. 2 depicts a taper that may be referred to as being "vertical" in direction. The design of FIG. 4 may be preferable for use in a single-mode Si—SiN coupler (e.g., a coupler that conveys an optical signal with a single mode). FIG. 2 (and/or FIG. 3) may be desirable for use in a coupler that conveys an optical signal with multiple horizontal modes, because the design of the couplers of FIG. 2 or 3 may not vary in the horizontal direction (e.g., in a direction that is parallel to the face of the Si substrate 235 and orthogonal to the direction of travel of the optical signal through the coupler).

Figure 5:
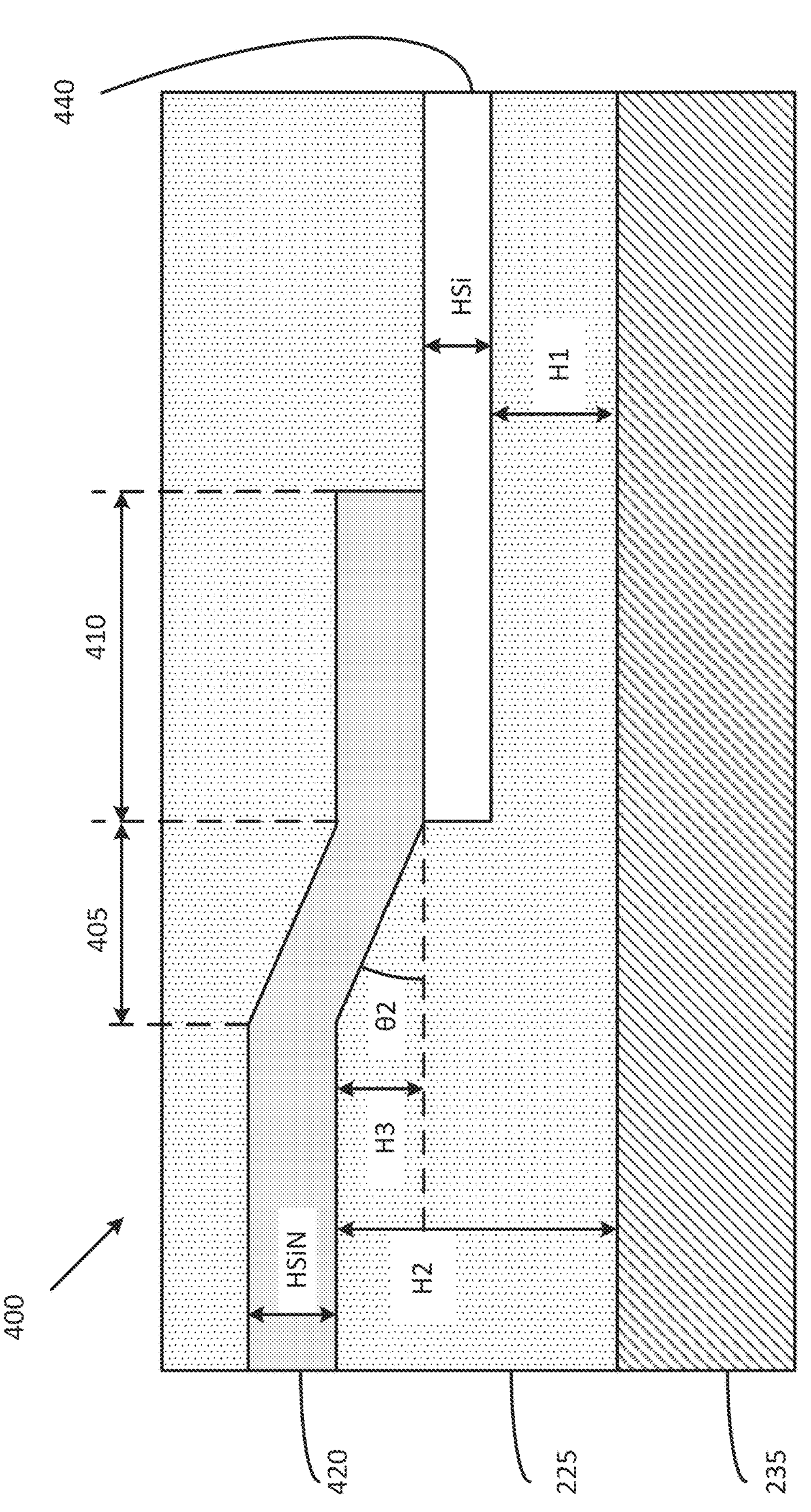
FIG. 5 illustrates an alternative example optical coupler, in accordance with various embodiments.

FIG. 5 depicts an alternative example cross-sectional view of a coupler 400, in accordance with various embodiments. Similarly to FIG. 3, FIG. 5 may include elements that are similar to those of FIG. 2, and will not be reiterated herein for the sake of lack of redundancy.

As may be seen in FIG. 5, the coupler 400 may include a SiN waveguide 420 and a Si waveguide 440, which may be respectively similar to SiN waveguide 220 and Si waveguide 240. The SiN waveguide 420 may generally overlap the Si waveguide 400 at portion 410, as shown. In embodiments, portion 410 may have a length of approximately five microns, while in other embodiments the length of portion 410 may be between approximately 0 microns and approximately 20 microns.

However, as shown in FIG. 5, the SiN waveguide 420 may include a downward ramping portion 405 such that the SiN waveguide 420 is adjacent to the Si waveguide 440 at portion 410. The downward ramping portion 405 may have a downward angle of θ2, which may be between approximately 1° and approximately 10°. In some specific embodiments, the angle θ2 may be approximately 3°. It will be understood that, although there may be some amount of optical leakage from the SiN waveguide 420 to the Si substrate 235 at portion 405, portion 405 may be small enough that the amount of leakage may be generally viewed as negligible.

It will be understood that the above-provided embodiments of FIGS. 2-5 are intended as non-limiting examples. For example, the specific values for thicknesses, angles, etc. are intended as example values in accordance with one embodiment, but other embodiments may vary. In some embodiments, the values may be presumed to be simplified example values and, in real world or alternative implementations, may have a variance such as +/− approximately 10% to account for imperfections such as manufacturing tolerances, etc. Additionally, while embodiments are described with respect to a SiN DeMUX in FIG. 1, other embodiments may have an additional or alternative optical element such as a multiplexer, an optical source, a modulator, etc. Additionally, although embodiments are described with respect to Si and SiN, other embodiments may have additional or alternative materials that are used for propagation of the optical signal. It will also be noted that certain elements of the various embodiments may be combined. For example, the Si waveguides 240 or 440 may have a top-down tapered shape similar to that of the Si waveguide 340. Other variations may be present in other embodiments.

We propose two types of couplers to solve the Si3N4-to-Si MM coupling problem and also Si3N4 MM coupler to bring down the optical signal from the layer with Si3N4 devices and waveguide to the layer with Si waveguides and device.

Figure 6:
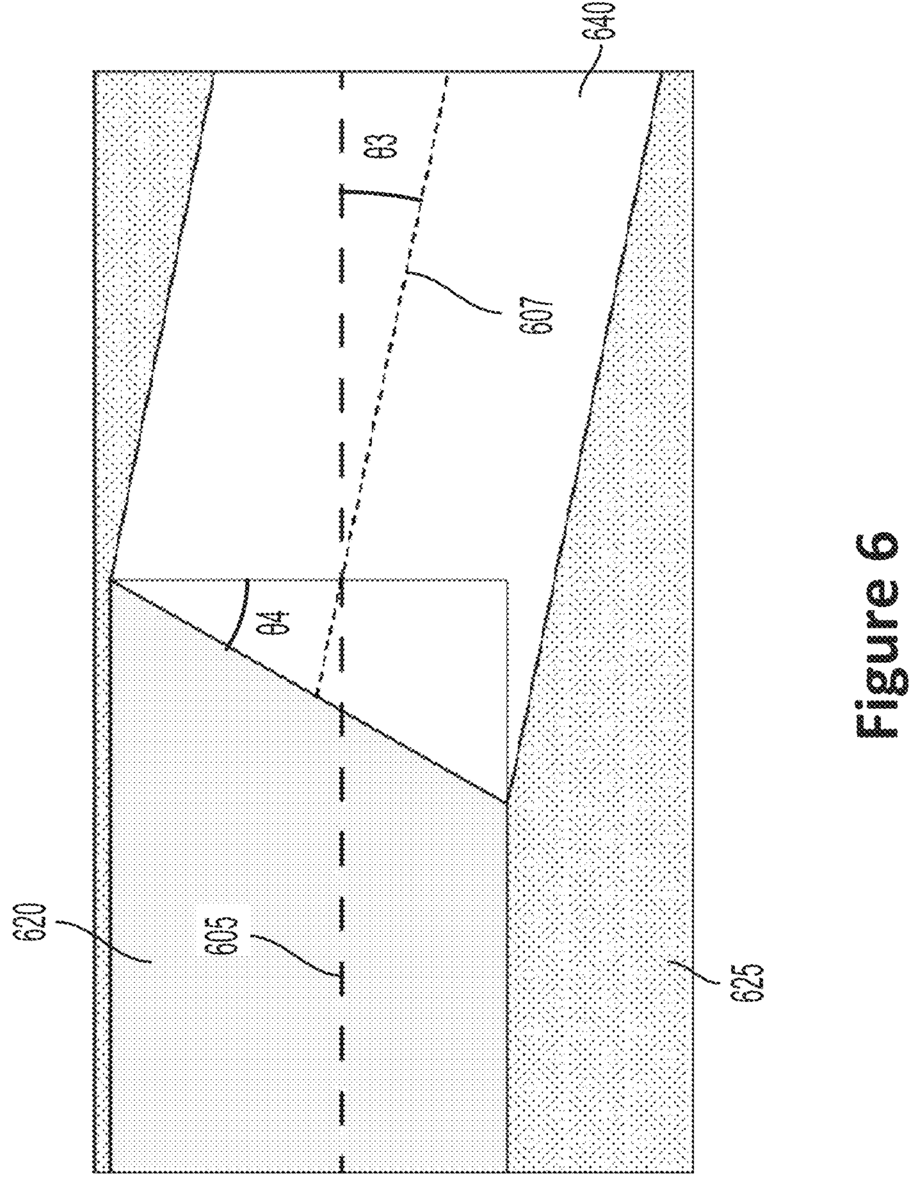
FIG. 6 illustrates a top-down view of an alternative example optical coupler, in accordance with various embodiments.

FIGS. 6-9 depict an alternative example optical coupler that may be used as optical coupler 130 and/or some other optical coupler of a PIC. Starting with FIG. 6, FIG. 6 depicts a top-down view of a coupler 600. The coupler 600 may include a SiN waveguide 620 and a Si waveguide 640, which may be respectively similar to SiN waveguide 220 and Si waveguide 240, and/or some other SiN or Si waveguide described herein. The coupler 600 may further include an oxide layer 625, which may be similar to oxide layer 225. It will be understood that, in the SiN waveguide 620, light may propagate along axis 605. In the Si waveguide, light may propagate along axis 607.

As may be seen in FIG. 6, the coupler may include geometry based on angles θ3 and 04. The waveguides 620 and 640 may be multimode waveguides (e.g., capable of carrying light with a plurality of optical modes). Such waveguides may be able to guide more optical modes than may actually be used. For example, the coupler 600 may be configured to guide 15 transverse electric (TE) modes (or, additionally or alternatively, transverse magnetic modes). However, only a subset of those modes (e.g., the four modes depicted in FIG. 9) may be used in the PIC. The SiN waveguide 620 may terminate at an angle θ4 (which may also be referred to as FctA) relative to a direction orthogonal to axis 605, as shown in FIG. 6. Generally, the angle θ4 may affect or control the refraction angle of the outgoing light (for some or all of the relevant optical modes) outside of the SiN waveguide 620. The angle between axis 605 and axis 607 is angle θ3 (which may also be referred to as WgTA). Angles θ3 or θ4 may be calculated based on one another as described below. For example, an "optimal" angle θ3 may be selected, and then the angle θ4 may be calculated (or vice-versa). As used herein, the "optimal" angle may be the angle that has the largest transmission characteristics, with the minimal backreflection characteristics.

Calculation of the optimal θ3 based on θ4, or vice versa, for each of the modes of interest may be done using a variation of Snell's Law as shown in Equation 1 as follows:

$$n_{Si}(m)\sin(\theta 3(m)) = n_{SiN}(m)\sin(\theta 4) \quad (1)$$

In Equation 1, m may represent the mode of interest such as TE1 where m=1, TE2 where m=2, etc. $n_{siN}$(m) may refer to the modal effective index of mode m in the SiN waveguide 620, and $n_{si}$(m) may refer to the effective modal index of mode m in the Si waveguide 640.

Equation 1 may be used to calculate a set of angles θ3(*m*), that is, a value for θ3 for respective ones of a plurality of modes of interest. In some embodiments, the best performance of the coupler 600 (e.g., performance with the least backreflection or loss) may be achieved when θ3 is the middle angle from the set θ3(*m*).

It will therefore be understood that the selected angle θ3 for the coupler 600 may be obtained by calculating various values for θ3 in simulations (e.g., finite-difference time-domain (FDTD) simulations) for a plurality of modes m. It will be understood that, if the waveguides 620 and/or 640 are wider, the spacing of the effective indices become more closely spaced (e.g., the effective indices of the guided modes are closer to one another), and therefore the "middle" θ3 may be produce desirable results for all modes of interest. Table 1, below, depicts example three-dimensional (3D) FDTD simulation results for the first 6 TE modes of a 10 micron wide waveguide (as measured in a direction orthogonal to axis 605 for the SiN waveguide 620 or axis 607 for the Si waveguide 640) with a value of θ3 of 8°.

TABLE 1

Example 3D FDTD simulation results of Simple Junction MM Coupler

| θ4 = 8°, θ3 = 3.87° | W = 10 microns | | |
|---|---|---|---|
| Over 6 modes & wavelength | Best [decibels (dB)] | Worst [dB] | Average [dB] |
| Transmission | 1.42 | 1.53 | 1.5 |
| Back reflection | 55 | 19 | 44 |

For this example waveguide, the angle θ3 obtained after scanning a range of angles is 3.87° in which case the best insertion loss (IL) of the six modes is 1.42 dB and worst is 1.53 dB. If one were to average the IL for the 6 modes using a typical AWG transmission for the 6 modes, then the average value is 1.5 dB. The backreflection (BR) is 55 dB for the best mode case, 19 dB for the worst mode case and on average 44 dB. The relatively low IL and relatively low BR values indicate that such a coupler 600 may be referred to as a low-loss and/or low-BR coupler.

Figure 7:
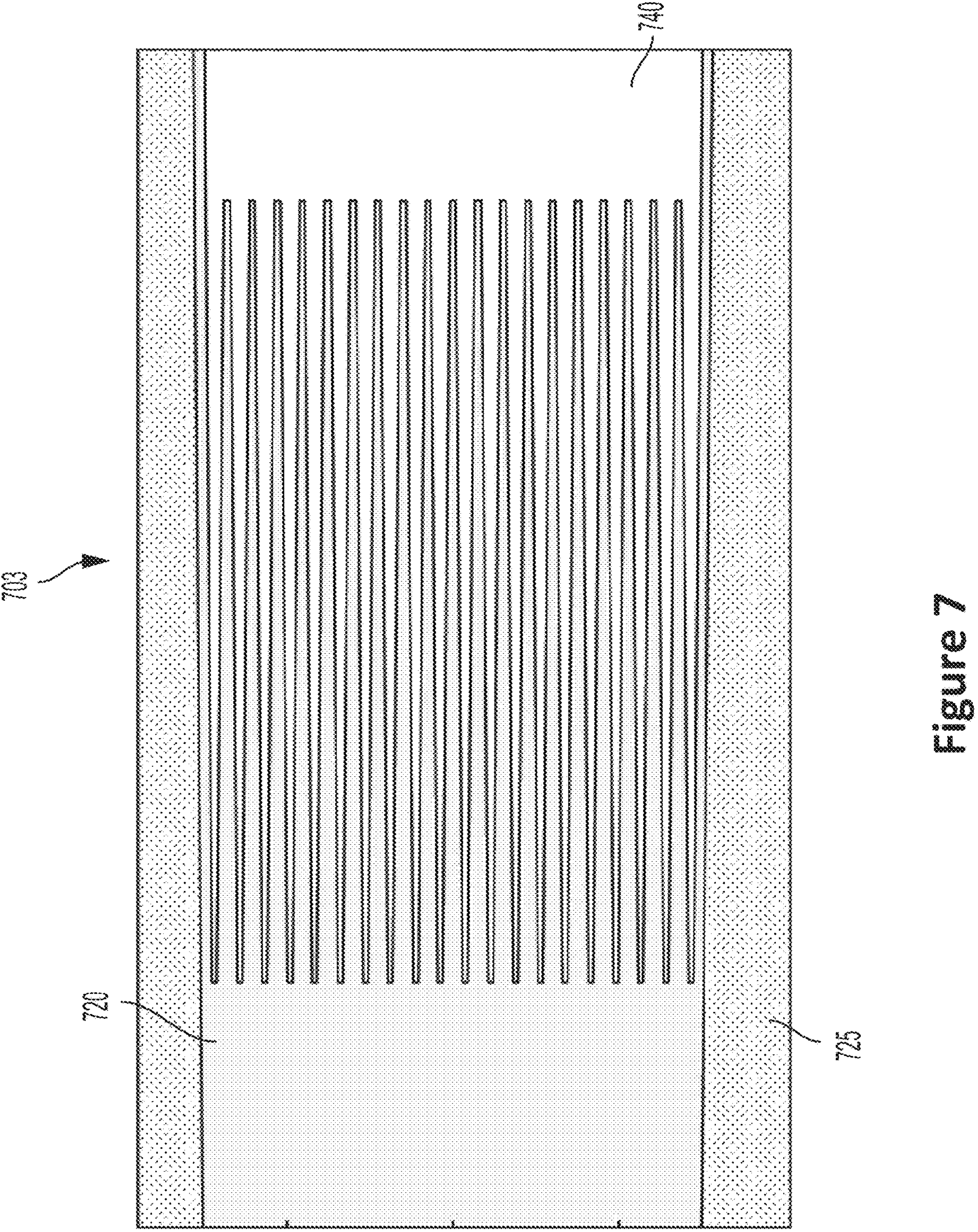
FIG. 7 illustrates a top-down view of an alternative example optical coupler, in accordance with various embodiments.

FIG. 7 depicts an alternative example of an optical coupler 700. Similarly to optical coupler 600, the optical coupler 700 may include a SiN waveguide 720, a Si waveguide 740, and an oxide layer 725, which may be respectively similar to SiN waveguide 620, Si waveguide 640, and oxide layer 625.

The waveguides 720 and 740 may be in a comb configuration, wherein each of the waveguides has a number of fingers 703 (e.g., the lateral "spikes" depicted in FIG. 7). Specifically, as shown in FIG. 7, the Si waveguide 740 has 20 fingers 703. It will be understood, however, that in other embodiments the number of fingers may be larger or smaller than 20, and may in some cases be a variable that is changed to achieve a desired result in terms of loss or backreflection. Specifically, an increased number of fingers may improve insertion loss, but degrade performance in terms of backreflection.

Table 2 depicts example 3D FDTD simulation results of the optical coupler of FIG. 7. In Table 2, the parameter "Blunt" corresponds to the width of the tip of each finger 703. Generally, it may be desirable to have the width at the tip of each finger be as close to 0 as possible. However, it will be recognized that it may be difficult to have the width be exactly 0 due to factors such as manufacturing tolerances.

It will also be noted that the same parameter may correspond to the width of the tip of the corresponding fingers of the SiN waveguide.

TABLE 2

Example 3D FDTD simulation results of "Comb" MM Coupler.

| Blunt = 0.15 μm | W = 10 μm, Number of Fingers = 25 | | |
|---|---|---|---|
| Over 6 modes & wavelength | Best [dB] | Worst [dB] | Average [dB] |
| Transmission | 0.6 | 1.02 | 0.8 |
| Back reflection | 36 | 17 | 27.2 |

As may be seen in Table 2, using the optical coupler 700 may have significantly improved insertion loss results as compared to coupler 600 with an average value of 0.8 dB. However, it will be noted that the backreflection values deteriorated on average. The deterioration may be due to the SiN waveguide 720 and the Si waveguide 740 being coaxial as shown in FIG. 7.

Figure 8:
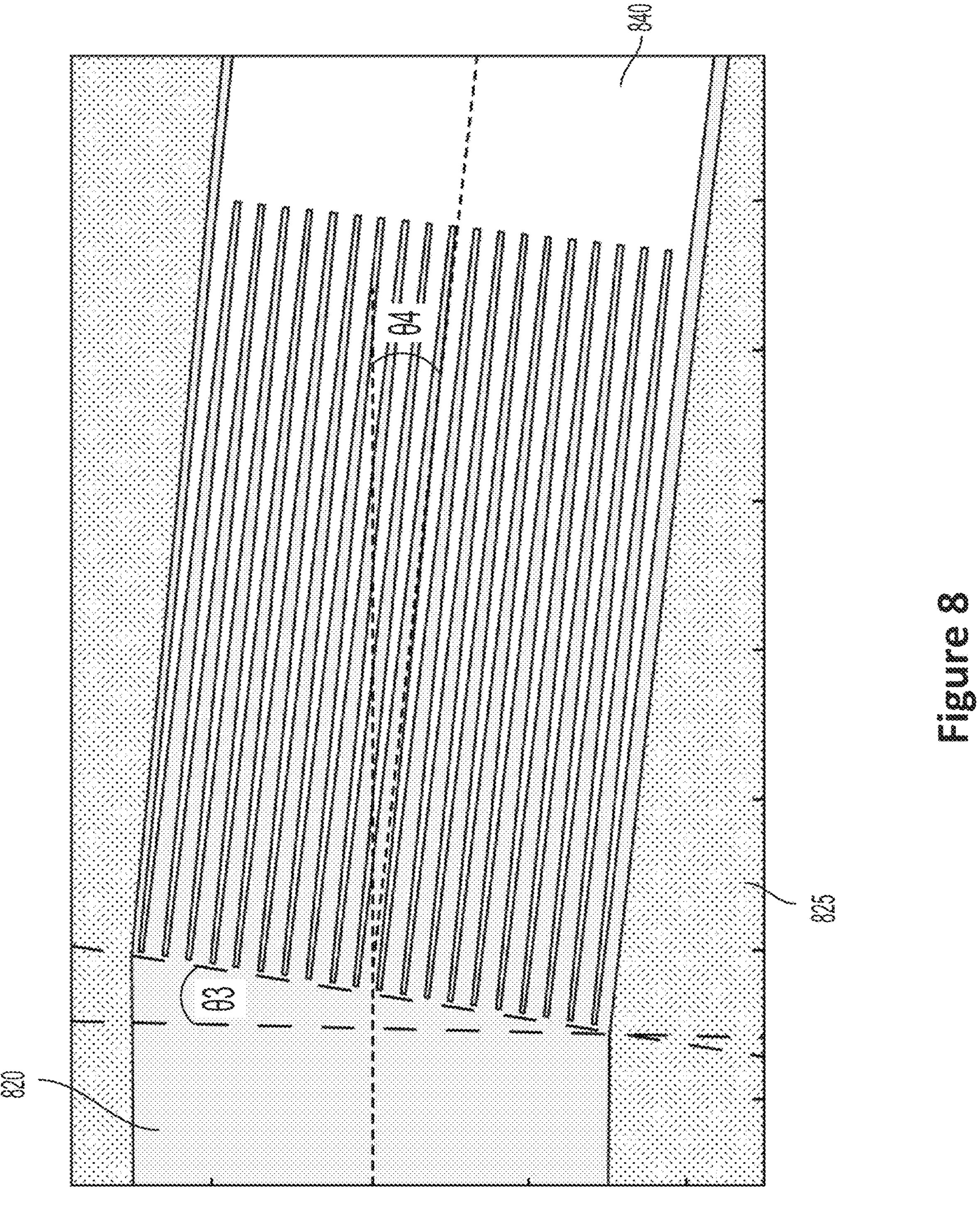
FIG. 8 illustrates a top-down view of an alternative example optical coupler, in accordance with various embodiments.

In embodiments, the backreflection may be compensated for by combining characteristics of the coupler 600 and the coupler 700, as shown in FIG. 8. Specifically, FIG. 8 depicts a coupler 800 that includes a SiN waveguide 820, a Si waveguide 840, and an oxide layer 825, which may be respectively similar to SiN waveguide 620, Si waveguide 640, and oxide layer 625. As may be seen, the waveguides 820 and 840 may include a number of fingers (e.g., as shown at 703 in FIG. 7). Additionally, the waveguides may be offset by angles θ3 and θ4. By making the waveguides 820 and 840 non co-axial as shown in FIG. 8, the backreflection values depicted in Table 2 may be compensated for.

Figure 10:
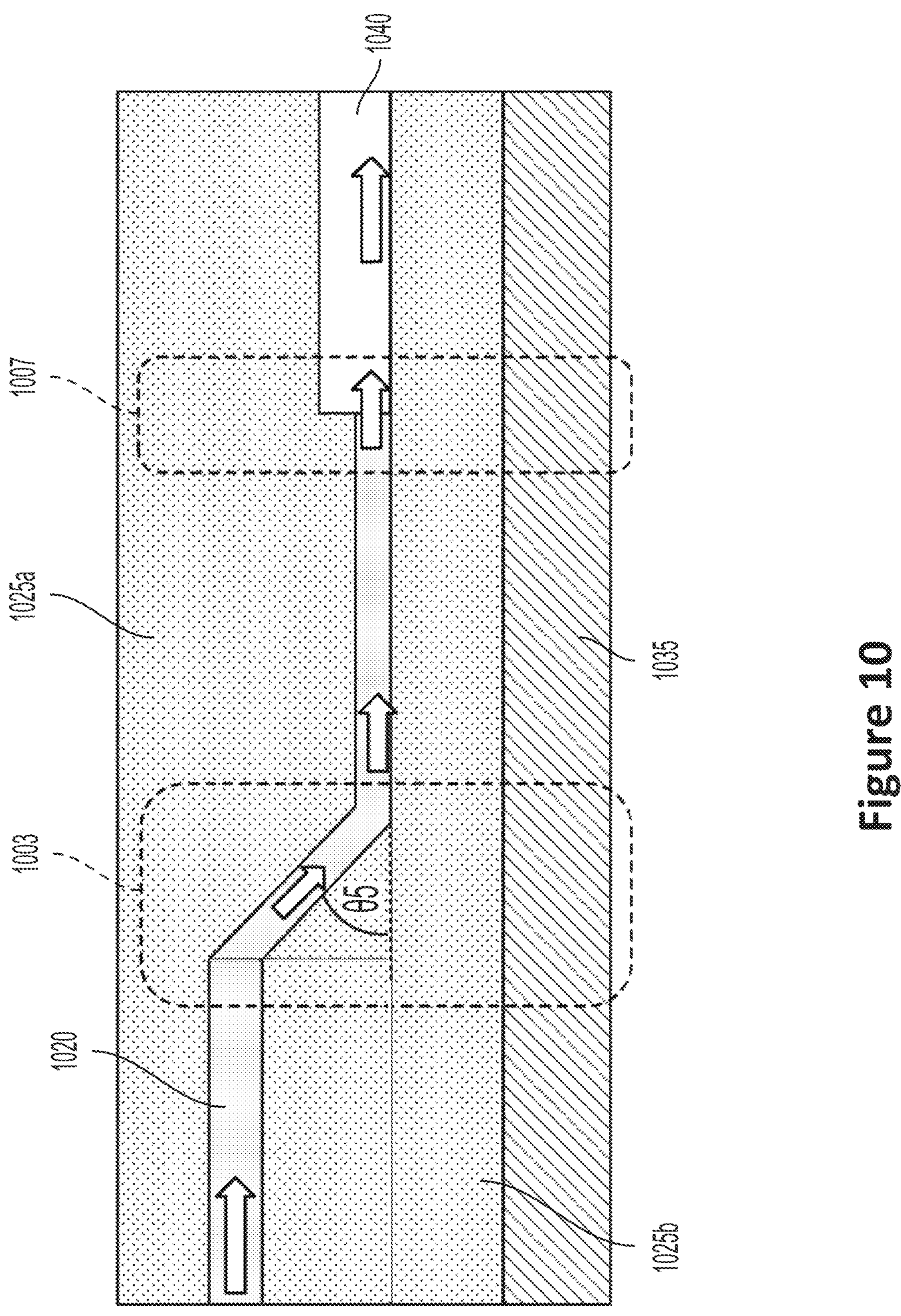
FIG. 10 illustrates a cross-sectional view of an alternative example optical coupler, in accordance with various embodiments.

FIG. 10 illustrates a cross-sectional view of an alternative example optical coupler, in accordance with various embodiments. Generally, the view of FIG. 10 may be similar to the views of Figures such as FIGS. 2, 3, and 5. Additionally, it will be understood that FIG. 10 is intended as a simplified cross-sectional view, and the concepts expressed in FIG. 10 may be combined with, for example, the angles θ3 and θ4 as described with respect to FIG. 6 or 8, and/or the comb configuration described with respect to FIG. 7.

The optical coupler of FIG. 10 may include and Si substrate 1035, oxide layers 1025*a* and 1025*b* (collectively, "oxide layer 1025"), Si layer 1040 acting as a Si waveguide, and SIN layer 1020 acting as a SiN waveguide, which may be respectively similar to Si substrate 235, oxide layer 225, Si waveguide 240, and SiN waveguide 220.

In some embodiments, the optical coupler of FIG. 10 may be referred to as a "downhill" multimode coupler. The optical coupler may be configured to rout the optical signal in some or all of the optical modes of interest from the relatively higher height (or level) of the SiN waveguide 1020 down to the lower height (or level) of the Si waveguide 1040 as shown in FIG. 10.

This routing may be done using the slope section depicted at 1003, which may be formed via deposition of the SiN, with subsequent definition of the waveguide via an etch process. In some embodiments, the slope section at 1003 may have an angle θ5, which may be on the order of approximately 0.5° and approximately 45°.

Subsequent to (e.g., to the right of) the slope section 1003 the SiN waveguide 1020 may abut the Si waveguide 1040 at 1007 such that the optical signal may propagate from the SiN waveguide 1020 into the Si waveguide 1040. This type of coupling may be referred to as a "butt-couple." It will be noted that the thicknesses of the SiN waveguide 1020 and the Si waveguide 1040 are depicted as different than one another such that the SiN waveguide 1020 is thinner than the Si waveguide 1040. However, in other embodiments, the SiN waveguide 1020 may be thicker than, or have the same thickness as, the Si waveguide 1040. Additionally, in some embodiments the SiN waveguide 1020 may extend at least partially along the top of the Si waveguide 1040 to provide additional cladding.

The arrows in FIG. 10 indicate propagating optical modes within the SiN waveguide 1020 and the Si waveguide 1040. As may be seen, the thickness of the oxide layer 1025*b* beneath the SiN waveguide 1020 prior to (e.g., on the left of) the slope section 1003 is thicker than the oxide thickness below the Si waveguide 1040 in a manner similar to that depicted in FIGS. 2, 3, and 5. As has been previously discussed, the reason for the increased thickness of the oxide layer 1025*b* is that the index contrast between the SiN waveguide 1020 and the oxide layer 1025*b* is smaller than the index contrast between the Si waveguide 1040 and the oxide layer 1025. As a result, the SiN waveguide 1020 may require thicker bottom cladding (e.g., a greater thickness of the oxide layer 1025*b*) to prevent the optical leakage to the Si substrate 1035. Once the optical signal propagates through the slope section 1003, it will be noted that there is a relatively short section of the SiN waveguide 1020 between the slope section 1003 and the coupling section 1007 where the SiN waveguide 1020 is at the level of the Si waveguide 1040. The optical leakage in this short section will generally be relatively small, and may be considered to be insignificant to the overall insertion loss of the optical coupler.

Figure 11:
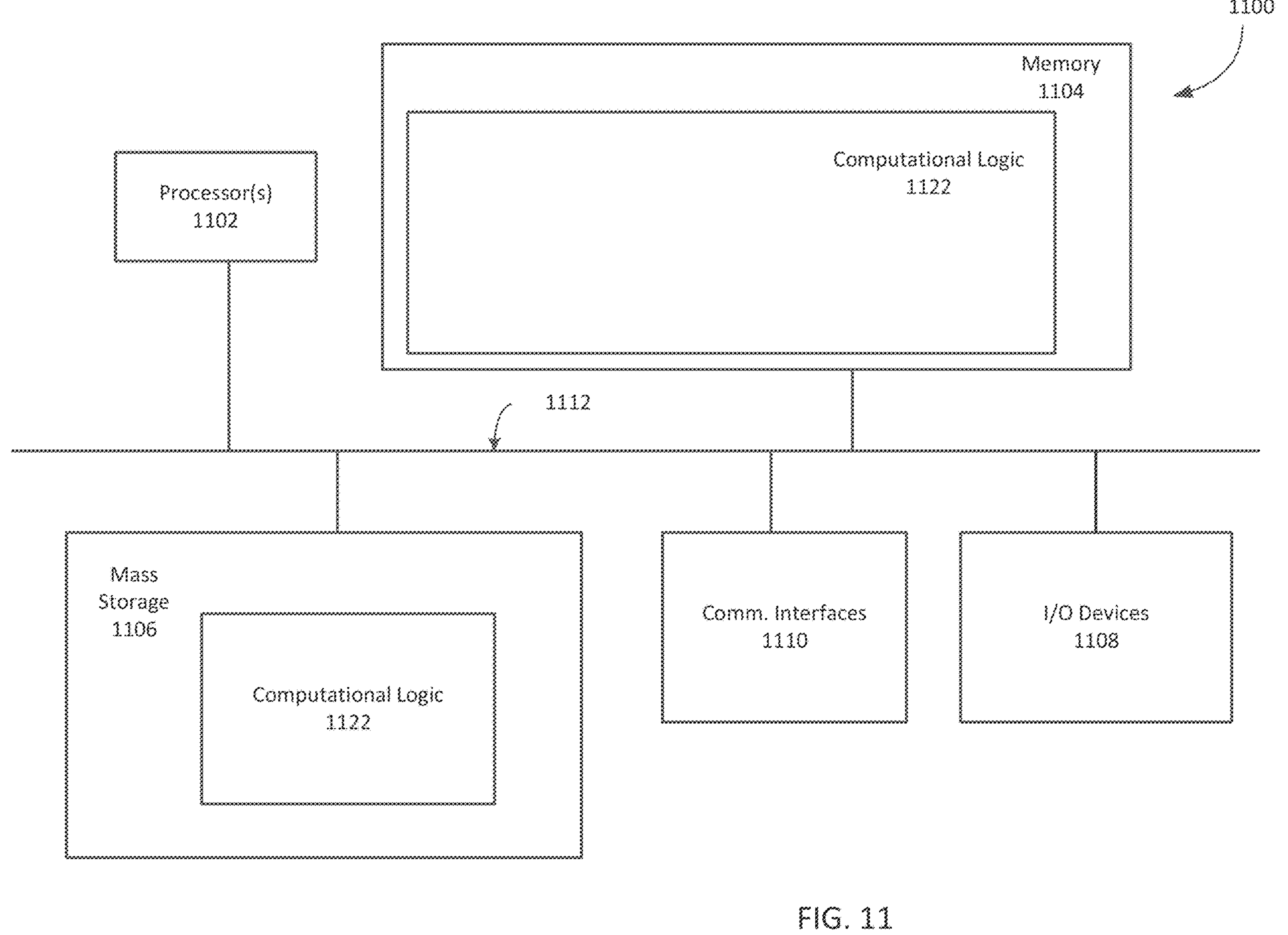
FIG. 11 illustrates an example computing system suitable for practicing various aspects of the disclosure, in accordance with various embodiments.

FIG. 11 illustrates an example computing device 1100 suitable for use to practice aspects of the present disclosure, in accordance with various embodiments. For example, the example computing device 1100 may include, or transmit/receive optical signals via, one or more of the couplers depicted herein. For example, in some embodiments such coupler(s) may be a part of, or coupled to, a processor such as one of processors 1102, or be a part of a bus such as bus 1112, as described below.

As shown, computing device 1100 may include one or more processors 1102, each having one or more processor cores, and system memory 1104. The processor 1102 may include any type of unicore or multi-core processors. Each processor core may include a central processing unit (CPU), and one or more level of caches. The processor 1102 may be implemented as an integrated circuit. The computing device 1100 may include mass storage devices 1106 (such as diskette, hard drive, volatile memory (e.g., dynamic random access memory (DRAM)), compact disc read only memory (CD-ROM), digital versatile disk (DVD) and so forth). In general, system memory 1104 and/or mass storage devices 1106 may be temporal and/or persistent storage of any type, including, but not limited to, volatile and non-volatile memory, optical, magnetic, and/or solid state mass storage, and so forth. Volatile memory may include, but not be limited to, static and/or dynamic random access memory. Non-volatile memory may include, but not be limited to, electrically erasable programmable read only memory, phase change memory, resistive memory, and so forth.

The computing device 1100 may further include input/output (I/O) devices 1108 such as a display, keyboard, cursor control, remote control, gaming controller, image capture device, one or more three-dimensional cameras used to capture images, and so forth, and communication interfaces 1110 (such as network interface cards, modems, infrared receivers, radio receivers (e.g., Bluetooth), and so forth). I/O devices 1108 may be suitable for communicative connections with three-dimensional cameras or user devices. In some embodiments, I/O devices 1108 when used as user devices may include a device necessary for implementing the functionalities of receiving an image captured by a camera.

The communication interfaces 1110 may include communication chips (not shown) that may be configured to operate the device 1100 in accordance with a Global System for Mobile Communication (GSM), General Packet Radio Service (GPRS), Universal Mobile Telecommunications System (UMTS), High Speed Packet Access (HSPA), Evolved HSPA (E-HSPA), or Long Term Evolution (LTE) network. The communication chips may also be configured to operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The communication chips may be configured to operate in accordance with Code Division Multiple Access (CDMA), Time Division Multiple Access (TDMA), Digital Enhanced Cordless Telecommunications (DECT), Evolution-Data Optimized (EV-DO), derivatives thereof, as well as any other wireless protocols that are designated as 3G, 4G, 5G, and beyond. The communication interfaces 1110 may operate in accordance with other wireless protocols in other embodiments.

The above-described computing device 1100 elements may be coupled to each other via system bus 1112, which may represent one or more buses. In the case of multiple buses, they may be bridged by one or more bus bridges (not shown). Each of these elements may perform its conventional functions known in the art. In particular, system memory 1104 and mass storage devices 1106 may be employed to store a working copy and a permanent copy of the programming instructions implementing the operations, functionalities, techniques, methods, or processes, in whole or in part, described herein, generally shown as computational logic 1122. Computational logic 1122 may be implemented by assembler instructions supported by processor(s) 1102 or high-level languages that may be compiled into such instructions.

The permanent copy of the programming instructions may be placed into mass storage devices 1106 in the factory, or in the field, though, for example, a distribution medium (not shown), such as a compact disc (CD), or through communication interfaces 1110 (from a distribution server (not shown)).

In the preceding description, various aspects of the illustrative implementations were described using terms commonly employed by those skilled in the art to convey the substance of their work to others skilled in the art. However, it will be apparent to those skilled in the art that embodiments of the present disclosure may be practiced with only some of the described aspects. For purposes of explanation, specific numbers, materials, and configurations were set forth in order to provide a thorough understanding of the illustrative implementations. It will be apparent to one skilled in the art that embodiments of the present disclosure may be practiced without the specific details. In other instances, well-known features have been omitted or simplified in order not to obscure the illustrative implementations.

In the preceding detailed description, reference is made to the accompanying drawings that form a part hereof, wherein like numerals designate like parts throughout, and in which is shown by way of illustration embodiments in which the subject matter of the present disclosure may be practiced. It is to be understood that other embodiments may be utilized and structural or logical changes may be made without departing from the scope of the present disclosure. Therefore, the detailed description is not to be taken in a limiting sense.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C). More generally, various embodiments may include any suitable combination of the above-described embodiments including alternative (or) embodiments of embodiments that are described in conjunctive form (and) above (e.g., the "and" may be "and/or"). Furthermore, some embodiments may include one or more articles of manufacture (e.g., non-transitory computer-readable media) having instructions, stored thereon, that when executed result in actions of any of the above-described embodiments. Moreover, some embodiments may include apparatuses or systems having any suitable means for carrying out the various operations of the above-described embodiments.

The description may have used perspective-based descriptions such as top/bottom, in/out, over/under, and the like. Such descriptions were used to facilitate the discussion and were not intended to restrict the application of embodiments described herein to any particular orientation.

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

The term "coupled with," along with its derivatives, may be used herein. "Coupled" may mean one or more of the following. "Coupled" may mean that two or more elements are in direct physical or electrical contact. However, "coupled" may also mean that two or more elements indirectly contact each other, but yet still cooperate or interact with each other, and may mean that one or more other elements are coupled or connected between the elements that are said to be coupled with each other. The term "directly coupled" may mean that two or more elements are in direct contact.

As used herein, the term "module" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable components that provide the described functionality.

These modifications may be made to the embodiments in light of the above detailed description. The terms used in the following claims should not be construed to limit the embodiments to the specific implementations disclosed in the specification and the claims. Rather, the scope of the invention is to be determined entirely by the following claims, which are to be construed in accordance with established doctrines of claim interpretation.

EXAMPLES

Example 1 includes a chip comprising: a silicon substrate; a silicon nitride waveguide; a silicon waveguide, wherein a portion of the silicon nitride waveguide overlaps a portion of the silicon waveguide; and an oxide layer coupled with a face of the silicon substrate, wherein a first portion of the oxide layer between the silicon substrate and the silicon nitride waveguide has a thickness that is greater than a thickness of a second portion of the oxide layer that is between the silicon waveguide and the oxide layer.

Example 2 includes the chip of example 1, and/or some other example herein, wherein the oxide layer further has a third portion that is between the silicon nitride waveguide and the silicon waveguide.

Example 3 includes the chip of example 2, and/or some other example herein, wherein the thickness of the third portion is between 100 nanometers (nm) and approximately 500 nm.

Example 4 includes the chip of any of examples 1-3, and/or some other example herein, wherein the thickness of the second portion of the oxide layer is 1 micrometer (micron).

Example 5 includes the chip of any of examples 1-4, and/or some other example herein, wherein the portion of the silicon waveguide is tapered in a direction perpendicular to the face of the silicon substrate.

Example 6 includes the chip of any of examples 1-5, and/or some other example herein, wherein the portion of the silicon waveguide is tapered in a direction parallel to the face of the silicon substrate and perpendicular to a direction of travel of light in the silicon waveguide.

Example 7 includes the chip of any of examples 1-6, and/or some other example herein, wherein the first portion of the oxide layer has a thickness between 1.5 micrometers (microns) and 3 microns.

Example 8 includes the chip of any of examples 1-7, and/or some other example herein, wherein the portion of the silicon waveguide is adjacent to the portion of the silicon nitride waveguide.

Example 9 includes the chip of example 8, and/or some other example herein, wherein a second portion of the silicon nitride waveguide slopes such that the portion of the silicon nitride waveguide has a distance from the silicon substrate that is less than a distance between a third portion of the silicon nitride waveguide and the silicon substrate.

Example 10 includes an apparatus comprising: a silicon substrate; a silicon nitride layer; a silicon layer, wherein a portion of the silicon nitride layer overlaps a portion of the silicon layer; and an oxide layer coupled with a face of the silicon substrate, wherein a first portion of the oxide layer between the silicon substrate and the silicon nitride layer has a thickness that is greater than a thickness of a second portion of the oxide layer that is between the silicon layer and the silicon substrate.

Example 11 includes the apparatus of example 10, and/or some other example herein, wherein the oxide layer further has a third portion that is between the silicon nitride layer and the silicon layer.

Example 12 includes the apparatus of example 11, and/or some other example herein, wherein the thickness of the third portion is between 100 nanometers (nm) and 500 nm.

Example 13 includes the apparatus of any of examples 10-12, and/or some other example herein, wherein the thickness of the second portion of the oxide layer is 1 micrometer (micron).

Example 14 includes the apparatus of any of examples 10-13, and/or some other example herein, wherein the portion of the silicon layer is tapered in a direction perpendicular to the face of the silicon substrate.

Example 15 includes the apparatus of any of examples 10-14, and/or some other example herein, wherein the portion of the silicon layer is tapered in a direction parallel to the face of the silicon substrate.

Example 16 includes the apparatus of any of examples 10-15, and/or some other example herein, wherein the first portion of the oxide layer has a thickness between 1.5 micrometers (microns) and 3 microns.

Example 17 includes the apparatus of any of examples 10-16, and/or some other example herein, wherein the portion of the silicon layer is adjacent to the portion of the silicon nitride layer.

Example 18 includes the apparatus of example 17, and/or some other example herein, wherein a second portion of the silicon nitride layer slopes such that the portion of the silicon nitride layer has a distance from the silicon substrate that is less than a distance between a third portion of the silicon nitride layer and the silicon substrate.

Example 19 includes a method of forming an optical coupler, wherein the method comprises: forming a silicon substrate; forming a silicon nitride waveguide; forming a silicon waveguide, wherein a portion of the silicon nitride waveguide overlaps a portion of the silicon waveguide; and forming an oxide layer coupled with a face of the silicon substrate, wherein a first portion of the oxide layer between the silicon substrate and the silicon nitride waveguide has a thickness that is greater than a thickness of a second portion of the oxide layer that is between the silicon waveguide and the oxide layer.

Example 20 includes the method of example 19, and/or some other example herein, wherein the thickness of the second portion of the oxide layer is 1 micrometer (micron).

Example 21 includes an optical coupler comprising: a silicon substrate; a silicon nitride waveguide positioned on the silicon substrate, the silicon nitride waveguide configured to guide an optical signal along a first axis; and a silicon waveguide positioned on the silicon substrate, wherein the silicon waveguide is configured to receive, from an output end of the silicon nitride waveguide, the optical signal at an input end of the silicon waveguide and guide the optical signal along a second axis that is at a first angle to the first axis.

Example 22 includes the optical coupler of example 21, and/or some other example herein, wherein the input end of the silicon waveguide includes a plurality of fingers of a comb that are aligned orthogonally to the second axis.

Example 23 includes the optical coupler of any of examples 21-22, and/or some other example herein, wherein the output end of the silicon nitride waveguide includes a plurality of fingers of a comb.

Example 24 includes the optical coupler of example 23, and/or some other example herein, wherein the fingers of the comb are aligned orthogonally to the second axis.

Example 25 includes the optical coupler of any of examples 21-24, and/or some other example herein, wherein the output end of the silicon nitride waveguide terminates at a second angle from a plane that is orthogonal to the first axis.

Example 26 includes the optical coupler of example 25, and/or some other example herein, wherein the first angle and the second angle are based on one another.

Example 27 includes the optical coupler of example 26, and/or some other example herein, wherein the first angle and the second angle are based on a plurality of modes of the optical signal.

Example 28 includes the optical coupler of any of examples 21-27, wherein the optical coupler is positioned between a demultiplexer and a photodiode.

Example 29 includes the optical coupler of example 28, and/or some other example herein, wherein the silicon nitride waveguide is an output waveguide of the demultiplexer.

Example 30 includes an apparatus comprising: a first silicon layer; a silicon nitride layer positioned on the first silicon layer, the wherein the silicon nitride layer has a first axis that defines a first end and a second end of the silicon nitride layer; and a second silicon layer positioned on the first silicon layer, wherein the second silicon layer has a second axis that defines a first end and a second end of the second silicon layer, and wherein the first end of the silicon nitride layer is adjacent to the first end of the second silicon layer, and wherein the first axis and second axis are at a non-zero first angle to one another.

Example 31 includes the apparatus of example 30, wherein the first end of the second silicon layer includes a plurality of fingers of a comb that are aligned orthogonally to the second axis.

Example 32 includes the apparatus of any of examples 30-31, and/or some other example herein, wherein the first end of the silicon nitride layer includes a plurality of fingers of a comb.

Example 33 includes the apparatus of example 32, and/or some other example herein, wherein the fingers of the comb are aligned orthogonally to the first axis.

Example 34 includes the apparatus of any of examples 30-33, wherein the first end of the silicon nitride waveguide terminates at a non-zero second angle from a plane that is orthogonal to the first axis.

Example 35 includes the apparatus of example 34, and/or some other example herein, wherein the first angle and the second angle are related to one another by Fresnel's equation.

Example 36 includes an optical coupler comprising: a silicon substrate; a silicon waveguide separated from the silicon substrate by an oxide layer, wherein the oxide layer has a first thickness between the silicon substrate and the silicon waveguide; and a silicon nitride waveguide configured to receive an optical signal from an optical source and output the optical signal to the silicon waveguide, wherein the silicon nitride waveguide includes: a first portion, wherein the first portion is separated from the silicon substrate by the oxide layer, and wherein the oxide layer has a second thickness between the silicon substrate and the first portion of the silicon nitride waveguide; and a second portion adjacent to the silicon waveguide, wherein the second portion is separated from the silicon substrate by the oxide layer, and wherein the oxide layer has the first thickness between the silicon substrate and the second portion of the silicon nitride waveguide.

Example 37 includes the optical coupler of example 36, and/or some other example herein, wherein the silicon nitride waveguide has a third portion positioned between the first portion and the second portion, wherein the second portion is sloped at an angle from the second thickness to the first thickness.

Example 38 includes the optical coupler of example 37, and/or some other example herein, wherein the silicon nitride waveguide has a fourth portion positioned between the second portion and the third portion, and wherein the oxide layer has the first thickness between the silicon substrate and the silicon nitride waveguide.

Example 39 includes the optical coupler of example 37, and/or some other example herein, wherein the angle is between 0.5° and 45°

Example 40 includes the optical coupler of any of examples 35-39, and/or some other example herein, wherein the silicon nitride waveguide has a thickness that is less than a thickness of the silicon waveguide.

Example 41 includes an optical system comprising: a silicon substrate; an oxide layer coupled with a face of the silicon substrate; a silicon nitride waveguide; a silicon waveguide; and an optical coupler that includes: a portion of the silicon nitride waveguide positioned at least partially within the oxide layer; and a portion of the silicon waveguide positioned at least partially within the oxide layer, wherein the portion of the silicon nitride waveguide at least partially overlaps the portion of the silicon waveguide such that the portion of the silicon waveguide is between the silicon substrate and the silicon nitride waveguide; wherein a first portion of the oxide layer between the silicon substrate and the portion of the silicon nitride waveguide has a thickness that is greater than a thickness of a second portion of the oxide layer that is between the silicon waveguide and the silicon substrate.

Example 42 includes the optical system of example 41, and/or some other example herein, wherein the portion of the silicon waveguide is tapered.

Example 43 includes a chip comprising: a silicon substrate; a first waveguide comprising silicon and nitrogen; a second waveguide comprising silicon, wherein a portion of the first waveguide overlaps a portion of the second waveguide; and an oxide layer coupled with a face of the silicon substrate, wherein a first portion of the oxide layer between the silicon substrate and the first waveguide has a thickness that is greater than a thickness of a second portion of the oxide layer that is between the second waveguide and the oxide layer.

Example 44 includes the chip of example 43, and/or some other example herein, wherein the oxide layer further has a third portion that is between the first waveguide and the second waveguide.

Example 45 includes the chip of example 44, and/or some other example herein, wherein the thickness of the third portion is between 100 nanometers (nm) and approximately 500 nm.

Example 46 includes the chip of any of examples 43-45, and/or some other example herein, wherein the thickness of the second portion of the oxide layer is 1 micrometer (micron).

Example 47 includes the chip of any of examples 43-46, and/or some other example herein, wherein the portion of the second waveguide is tapered in a direction perpendicular to the face of the silicon substrate.

Example 48 includes the chip of any of examples 43-47, and/or some other example herein, wherein the portion of the second waveguide is tapered in a direction parallel to the face of the silicon substrate and perpendicular to a direction of travel of light in the second waveguide.

Example 49 includes the chip of any of examples 43-48, and/or some other example herein, wherein the first portion of the oxide layer has a thickness between 1.5 micrometers (microns) and 3 microns.

Example 50 includes the chip of any of examples 43-49, and/or some other example herein, wherein the portion of the second waveguide is adjacent to the portion of the first waveguide.

Example 51 includes the chip of example 50, and/or some other example herein, wherein the first waveguide tapers such that the portion of the first waveguide has a distance from the silicon substrate that is less than a distance between another portion of the first waveguide and the silicon substrate.

Example 52 includes an apparatus comprising: a first layer comprising silicon; a second layer comprising silicon and nitrogen, the second layer on the first layer, the wherein the second layer has a first axis that defines a first end and a second end of the second layer; and a third layer comprising silicon, the third layer on the first layer, wherein the third layer has a second axis that defines a first end and a second end of the third layer, and wherein the first end of the second layer is adjacent to the first end of the third layer, and wherein the first axis and second axis are at a non-zero first angle to one another.

Example 53 includes the apparatus of example 52, and/or some other example herein, wherein the first end of the third layer includes a plurality of fingers of a comb that are aligned orthogonally to the second axis.

Example 54 includes the apparatus of any of examples 52-53, and/or some other example herein, wherein the first end of the second layer includes a plurality of fingers of a comb.

Example 55 includes the apparatus of example 54, and/or some other example herein, wherein the fingers of the comb are aligned orthogonally to the first axis.

Example 56 includes the apparatus of any of examples 52-55, and/or some other example herein, wherein the first end of the second layer terminates at a non-zero second angle from a plane that is orthogonal to the first axis.

Example 57 includes the apparatus of example 56, and/or some other example herein, wherein the first angle and the second angle are related to one another by Fresnel's equation.

Example Z01 may include an apparatus comprising means to perform one or more elements of a method described in or related to any of the examples herein, and/or any other method, process, or technique process described herein, or portions or parts thereof.

Example Z02 may include an apparatus comprising logic, modules, or circuitry to perform one or more elements of a method described in or related to any of the examples herein, and/or any other method, process, or technique described herein, or portions or parts thereof.

Example Z03 may include a method, technique, or process as described in or related to any of the examples herein, and/or any other method, process, or technique described herein, or portions or parts thereof.

Example Z04 may include a signal as described in or related to any of the examples herein, and/or any other method, process, or technique described herein, or portions or parts thereof.

Example Z05 may include an apparatus comprising one or more processors and non-transitory computer-readable media that include instructions which, when executed by the one or more processors, are to cause the apparatus to perform one or more elements of a method described in or related to any of the examples herein, and/or any other method, process, or technique described herein, or portions or parts thereof.

Example Z06 may include one or more non-transitory computer readable media comprising instructions that, upon execution of the instructions by one or more processors of an electronic device, are to cause the electronic device to perform one or more elements of a method described in or related to any of the examples herein, and/or any other method, process, or technique described herein, or portions or parts thereof.

Example Z07 may include a computer program related to one or more elements of a method described in or related to any of the examples herein, and/or any other method, process, or technique described herein, or portions or parts thereof.

The invention claimed is:

1. An optical coupler comprising:

a silicon substrate;

a silicon nitride waveguide positioned on the silicon substrate, the silicon nitride waveguide configured to guide an optical signal along a first axis; and a silicon waveguide positioned on the silicon substrate, wherein the silicon waveguide is configured to receive, from an output end of the silicon nitride waveguide, the optical signal at an input end of the silicon waveguide and guide the optical signal along a second axis that is at a first angle to the first axis, wherein the first angle is a non-zero angle, wherein the output end of the silicon nitride waveguide terminates at a non-zero second angle from a plane that is orthogonal to the first axis, and wherein the first angle and the non-zero second angle are related to one another based on modal effective indices of a plurality of modes of the optical signal.

2. The optical coupler of claim 1, wherein the input end of the silicon waveguide includes a plurality of fingers of a comb that are aligned orthogonally to the second axis.

3. The optical coupler of claim 1, wherein the output end of the silicon nitride waveguide includes a plurality of fingers of a comb.

4. The optical coupler of claim 3, wherein the plurality of fingers of the comb are aligned orthogonally to the second axis.

5. The optical coupler of claim 1, wherein the first angle and the non-zero second angle are based on one another.

6. The optical coupler of claim 1, wherein the optical coupler is positioned between a demultiplexer and a photodiode.

7. The optical coupler of claim 6, wherein the silicon nitride waveguide is an output waveguide of the demultiplexer.

8. An apparatus comprising:

a first layer comprising silicon;

a second layer comprising silicon and nitrogen, the second layer on the first layer, wherein the second layer has a first axis that defines a first end and a second end of the second layer; and a third layer comprising silicon, the third layer on the first layer, wherein the third layer has a second axis that defines a first end and a second end of the third layer, and wherein the first end of the second layer is adjacent to the first end of the third layer, and wherein the first axis and second axis are at a non-zero first angle to one another, wherein the first end of the second layer terminates at a non-zero second angle from a plane that is orthogonal to the first axis, and wherein the non-zero first angle and the non-zero second angle are related to one another based on modal effective indices of a plurality of modes.

9. The apparatus of claim 8, wherein the first end of the third layer includes a plurality of fingers of a comb that are aligned orthogonally to the second axis.

10. The apparatus of claim 8, wherein the first end of the second layer includes a plurality of fingers of a comb.

11. The apparatus of claim 10, wherein the plurality of fingers of the comb are aligned orthogonally to the first axis.

12. The apparatus of claim 8, wherein the non-zero first angle and the non-zero second angle are related to one another by Snell's Law.

13. An optical coupler comprising:

a silicon substrate;

a silicon waveguide separated from the silicon substrate by an oxide layer, wherein the oxide layer has a first thickness between the silicon substrate and the silicon waveguide; and a silicon nitride waveguide configured to receive an optical signal from an optical source and output the optical signal to the silicon waveguide, wherein the silicon nitride waveguide includes:

a first portion, wherein the first portion is separated from the silicon substrate by the oxide layer, and wherein the oxide layer has a second thickness between the silicon substrate and the first portion of the silicon nitride waveguide; and a second portion adjacent to the silicon waveguide, wherein the second portion is separated from the silicon substrate by the oxide layer, and wherein the oxide layer has the first thickness between the silicon substrate and the second portion of the silicon nitride waveguide, wherein the silicon nitride waveguide and the silicon waveguide are configured to guide the optical signal along respective axes that are at a non-zero first angle to one another, wherein an output end of the silicon nitride waveguide terminates at a non-zero second angle from a plane that is orthogonal to an axis of the silicon nitride waveguide, and wherein the non-zero first angle and the non-zero second angle are related to one another based on modal effective indices of a plurality of modes of the optical signal.

14. The optical coupler of claim 13, wherein the silicon nitride waveguide has a third portion positioned between the first portion and the second portion, wherein the second portion is sloped at an angle from the second thickness to the first thickness.

15. The optical coupler of claim 14, wherein the silicon nitride waveguide has a fourth portion positioned between the second portion and the third portion, and wherein the oxide layer has the first thickness between the silicon substrate and the silicon nitride waveguide.

16. The optical coupler of claim 14, wherein the angle is between 0.5° and 45°.

17. The optical coupler of claim 14, wherein the silicon nitride waveguide has a thickness that is less than a thickness of the silicon waveguide.

* * * * *